United States Patent
Shigeno et al.

(10) Patent No.: US 9,354,248 B2
(45) Date of Patent: May 31, 2016

(54) METHOD FOR MEASURING VIBRATION CHARACTERISTIC OF CANTILEVER

(71) Applicant: HITACHI HIGH-TECH SCIENCE CORPORATION, Minato-ku, Tokyo (JP)

(72) Inventors: Masatsugu Shigeno, Tokyo (JP); Yoshiteru Shikakura, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 14/673,372

(22) Filed: Mar. 30, 2015

(65) Prior Publication Data

US 2015/0276796 A1 Oct. 1, 2015

(30) Foreign Application Priority Data

Mar. 31, 2014 (JP) .................................. 2014-071071

(51) Int. Cl.
*G01Q 20/00* (2010.01)
*G01Q 10/00* (2010.01)
*G01H 1/00* (2006.01)

(52) U.S. Cl.
CPC . *G01Q 10/00* (2013.01); *G01H 1/00* (2013.01)

(58) Field of Classification Search
USPC ........... 850/1, 2, 3, 4, 5, 6, 7, 19, 20; 73/1.82, 73/570, 662
See application file for complete search history.

(56) References Cited

U.S. PATENT DOCUMENTS

| | | | | |
|---|---|---|---|---|
| 5,794,080 | A * | 8/1998 | Watanabe et al. | 396/53 |
| 6,311,557 | B1 * | 11/2001 | Davis et al. | 73/514.31 |
| 2006/0213260 | A1 * | 9/2006 | Nakamoto | 73/105 |
| 2014/0202260 | A1 * | 7/2014 | Nakamura | 73/862.59 |

FOREIGN PATENT DOCUMENTS

| | | |
|---|---|---|
| JP | 7-174767 A | 7/1995 |
| JP | 2012-202841 A | 10/2012 |

OTHER PUBLICATIONS

Extended Search Report for corresponding European Application No. 15 16 1370.0 dated Oct. 15, 2015, 5 pages.
Lübbe, J. et al., "Measurement and Modelling of Non-Contact Atomic Force Microscope Cantilever Properties from Ultra-High Vacuum to Normal Pressure Conditions", *Measurement Science and Technology*, IOP Publishing, vol. 22, Mar. 23, 2011, 3 pages.
Martinez, J. et al., "Calibration of Oscillation Amplitude in Dynamic Scanning Force Microscopy", *Nanotechnology*, IOP Publishing, vol. 24, Apr. 10, 2013, 10 pages.
Yamanaka et al., "Resonance Frequency and Q Factor Mapping by Ultrasonic Atomic Force Microscopy", *Applied Physics Letters*, vol. 78, No. 13, Mar. 26, 2001, 4 pages.

* cited by examiner

*Primary Examiner* — Nicole Ippolito
(74) *Attorney, Agent, or Firm* — Brinks Gilson & Lione

(57) ABSTRACT

A method for measuring vibration characteristic of a cantilever is proposed in this disclosure. The method includes: measuring vibration amplitude V of a cantilever installed in a scanning probe microscope when vibration with a resonant frequency f1 (Hz) is applied to the cantilever; obtaining a time Th (second) when the vibration amplitude V is equal to or more than 0.90 of a stationary amplitude V0; and calculating a Q value by using the following Expression: Q value=f1×Th.

5 Claims, 4 Drawing Sheets

METHOD FOR MEASURING VIBRATION CHARACTERISTIC OF CANTILEVER

RELATED APPLICATIONS

This application claims priority from Japanese Patent Application No. 2014-071071, filed on Mar. 31, 2014, the entire subject matter of which is incorporated herein by reference.

BACKGROUND OF THE INVENTION

1. Field of the Invention

The present invention relates to a method for measuring a vibration characteristic of a cantilever installed in a scanning probe microscope.

2. Description of the Related Art

A scanning probe microscope causes a probe which is attached to a tip end of a cantilever to approach a surface of a sample or brings the probe into contact with the surface of the sample and then measures a surface shape of the sample. As measurement modes of the scanning probe microscope, (1) a contact mode and (2) a so-called dynamic force mode (DFM) measurement mode has been known. In the contact mode, an interatomic force between a probe and a sample is held to be constant and a surface shape of the sample is measured. In the DFM measurement mode, a cantilever is forced to vibrate at a frequency near a resonant frequency by using a piezoelectric element and a shape of the sample is measured by using attenuation of amplitude of the probe due to an intermittent contact between the probe and the sample when the probe is caused to approach the sample (see, for example, JP-H7 (1995)-174767).

However, each cantilever has a subtly different shape and a different index which has an influence on a resonant frequency which is the vibration characteristic of the cantilever and measurement sensitivity referred to as a Q value. For this reason, in the DFM measurement mode or a non-contact measurement mode, there may be necessary that when measurement is performed, the above-described resonant frequency and Q value are measured in advance and measurement of a sample is performed based on these values.

In the related art, a resonant frequency and a Q value are measured as illustrated in FIG. 5. That is, in a state where a cantilever is separated from a sample, vibration intensity is held to be constant and amplitude and a Q-curve (frequency-amplitude characteristic) C1 illustrated in FIG. 5 are measured while vibration is applied at a predetermined sweep speed in a frequency range including the resonant frequency. Accordingly, a resonant frequency f1 and a Q value can be measured by analyzing a waveform of the Q-curve C1. That is, a frequency f1 at a peak position in the Q-curve C1 corresponds to the resonant frequency and the Q value is measured by using Q value=f1/Fw (Fw: a half width of the Q-curve (FWHM)). The Q value is an index indicating viscosity of the cantilever. The Q value is controlled by detecting a speed signal from vibration of the cantilever when a sample is measured and adding the detected speed signal to a vibration applying signal and thus it is possible to obtain higher resolution than that in the related art.

In addition, regarding measurement of a resonant frequency, a frequency sweep signal for reciprocating is generated for a short time, a frequency at the maximum of amplitude in each of an approaching motion and a retracting motion is measured, and the median value of the frequency is detected as a resonant frequency. Accordingly, it is possible to measure a resonant frequency with high accuracy for a very short time (see, for example, JP-A-2012-202841).

Meanwhile, the Q-curve illustrated in FIG. 5 is measured by obtaining a vibration amplitude when a vibration frequency is swept (changed). However, an optimal sweep speed (sweep time) varies depending on the Q value. For example, in FIG. 5, if the sweep speed is slow, a correct Q-curve C1 is obtained, but if the sweep speed is excessively fast, a Q-curve C2 is obtained. A waveform of the Q-curve is changed and thus the correct Q value and a correct resonant frequency f1 are not obtained. That is, it may be necessary to measure a Q-curve in order to obtain a Q value and a resonant frequency f1, but there may be a problem in that a measurement condition for the Q-curve itself depends on the Q value. Furthermore, the resonant frequency f1 corresponds to a peak value of the Q-curve, but depends on the sweep speed. Thus, a peak of the amplitude is shifted in a sweeping direction and becomes a value different from an original value.

Accordingly, in the related art, for example, the Q-curve is measured by determining the sweep speed based on experience or repeating to change the sweep speed and to perform measurement over and over again, or the sweep speed is delayed to measure the Q-curve for a long time. Since it is unclear whether or not the obtained Q value is a correct value based on the optimal sweep speed, measurement is performed with a setting which is shifted from a setting of an optimal measurement condition in many cases.

In this manner, there may be problems as follows. If an accurate Q value is intended to be obtained, a time of measuring the Q-curve becomes long and measurement efficiency may be degraded. If a measurement time of Q-curve is short, the Q value becomes inaccurate and it may become impossible even to determine whether or not the obtained Q value is the correct value.

SUMMARY OF THE INVENTION

The present invention has been made in view of the above-described circumstances, and one of objects of the present invention is to provide a method for measuring a vibration characteristic of a cantilever installed in a scanning probe microscope, a non-transitory computer-readable storage medium and a scanning probe microscope, which are capable of measuring a Q value which corresponds to a vibration characteristic of the cantilever in a scanning probe microscope with high accuracy regardless of a measurement condition of a Q-curve.

According to an exemplary embodiment of the present invention, there is provided a method for measuring vibration characteristic of a cantilever, the method including: measuring vibration amplitude V of a cantilever installed in a scanning probe microscope when vibration with a resonant frequency f1 (Hz) is applied to the cantilever; obtaining a time Th (second) when the vibration amplitude V is equal to or more than 0.90 of a stationary amplitude V0; and calculating a Q value by using the following Expression (1):

$$Q\ \text{value} = f1 \times Th \qquad (1)$$

According to another exemplary embodiment of the present invention, there is provided a non-transitory computer-readable storage medium storing instructions to control a scanning probe microscope comprising a cantilever having a probe at a tip end, a cantilever vibrating unit that applies vibration to the cantilever, a displacement detection device that detects an amount of displacement of the cantilever and measures a vibration amplitude V of the cantilever and a control unit that controls the cantilever vibrating unit, the instructions causing the scanning probe microscope to perform: measurement processing for measuring vibration amplitude V of the cantilever by the displacement detection device when a vibration with a resonant frequency f1 (Hz) is applied to the cantilever by the cantilever vibrating unit; obtaining processing for obtaining a time Th (second) when the vibration amplitude V is equal to or more than 0.90 of a stationary amplitude V0 by the control unit; and calculation processing for calculating a Q value by the control unit by using the following Expression (1):

$$Q \text{ value} = f1 \times Th \qquad (1)$$

According to still another exemplary embodiment of the present invention, there is provided a scanning probe microscope including: a cantilever having a probe at a tip end; a cantilever vibrating unit configured to apply vibration to the cantilever; a displacement detection device configured to detect an amount of displacement of the cantilever and to measure a vibration amplitude V of the cantilever; and a control unit configured to control the cantilever vibrating unit. The displacement detection device measures the vibration amplitude V of the cantilever when a vibration with a resonant frequency f1 (Hz) is applied to the cantilever by the cantilever vibrating unit. The control unit obtains a time Th (second) when the vibration amplitude V is equal to or more than 0.90 of a stationary amplitude V0. The control unit calculates a Q value by the control unit by using the following Expression (1):

$$Q \text{ value} = f1 \times Th \qquad (1)$$

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 1A and 1B are schematic diagrams, wherein FIG. 1A is a block diagram of a scanning probe microscope to which the present invention is appropriately applied, and wherein FIG. 1B is an enlarged view of a part of the vicinity of a cantilever installed in the scanning probe microscope;

DETAILED DESCRIPTION OF THE PREFERRED EMBODIMENTS

Hereinafter, an embodiment according to the present invention will be described with reference to the accompanying drawings.

Figure 1A:
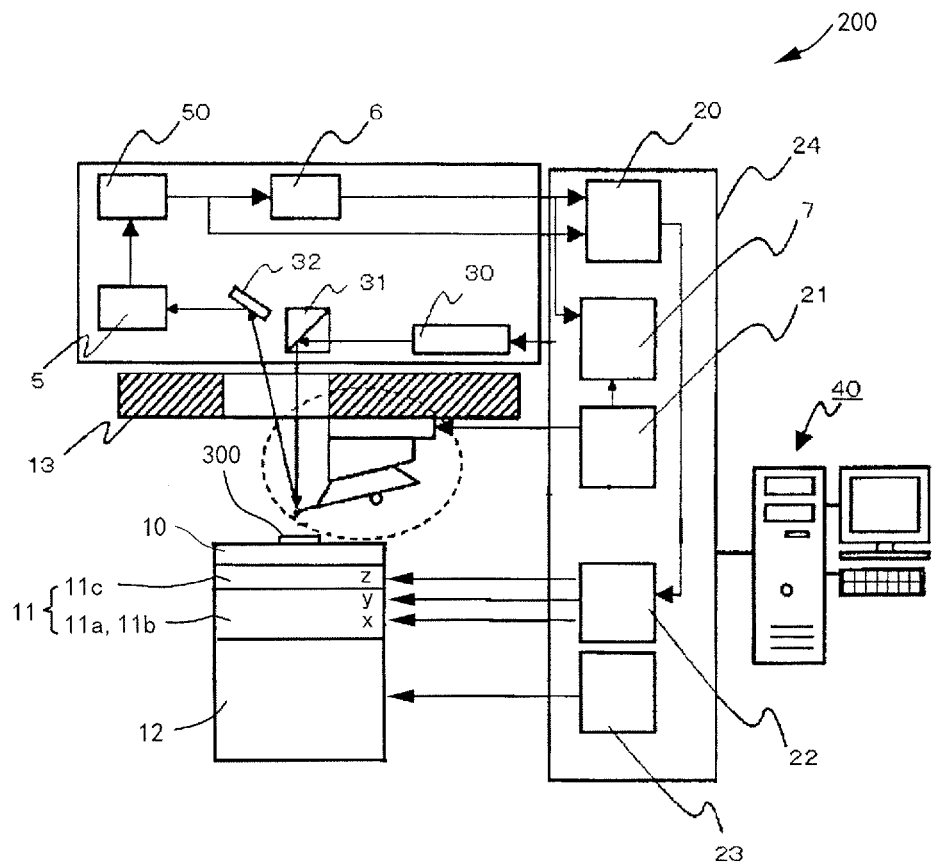
Figure 1B:
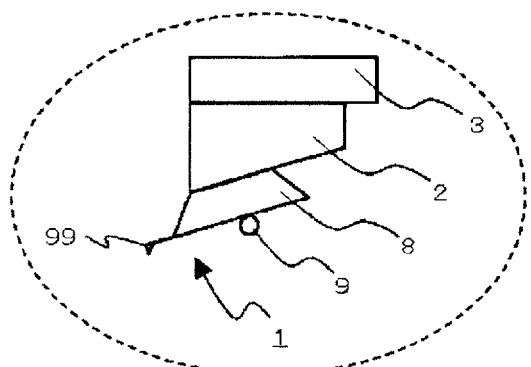

FIG. 1A is a block diagram of a scanning probe microscope 200 to which the present invention is appropriately applied. FIG. 1A is an overall diagram of the scanning probe microscope 200 and FIG. 1B is an enlarged view of a part of the vicinity of a cantilever 1.

As shown in FIG. 1A, the scanning probe microscope 200 is provided with a cantilever 1 that includes a probe 99 at a tip end, a cantilever vibrating unit 3 that applies vibration to the cantilever 1, a vibration applying power source 21 for driving the cantilever vibrating unit 3, control unit configured by a processor including at least a probe microscope controller 24 and a computer 40.

The computer 40 is provided with a control board, a CPU (central processing unit), a memory such as a ROM, a RAM, and a hard disk, an interface, an operation unit, and the like in order to control an operation of the scanning probe microscope 200.

The probe microscope controller 24 is provided with a Z control circuit 20, a frequency-vibration characteristic detector 7, a rough movement mechanism 12, a cylindrical actuator (scanner) 11 that is attached over the rough movement mechanism 12, a stage 10 that is connected above the actuator 11, a vibration applying power source 21, an X, Y, Z output amplifier 22, and a rough movement control circuit 23 which will be described later. The probe microscope controller 24 is connected to the computer 40 to enable high speed communication of data. The computer 40 controls an operation condition of a circuit in the probe microscope controller 24 and controls reception of measured data to implement measurement of a Q value and a resonant frequency of the cantilever 1, measurement of a Q-curve (frequency-vibration characteristic), measurement of a surface shape, measurement of surface properties, and the like.

The rough movement mechanism 12 roughly moves the actuator 11 and the stage 10 over the actuator 11 in three-dimensions and the rough movement control circuit 23 controls an operation of the rough movement mechanism 12.

The actuator 11 moves (finely moves) the stage 10 (and a sample 300) in the three-dimensions and includes two (two axial) piezoelectric elements 11a, 11b that cause the stage 10 to be scanned respectively in xy (plane of the sample 300) directions and a piezoelectric element 11c that causes the stage 10 to be scanned in a z (height) direction. The piezoelectric elements are elements in which if an electric field is applied, a crystal is distorted and if the crystal is forced to be distorted with external force, an electric field is generated. As the piezoelectric elements, PZT (lead zirconate titanate) which is a type of ceramics may be generally used, but it is not limited to PZT.

The piezoelectric elements 11a to 11c are connected to the X, Y, Z output amplifier 22 and outputs a predetermined control signal (voltage) to the X, Y, Z output amplifier 22 so as to drive the piezoelectric elements 11a, 11b respectively in the xy directions and to drive the piezoelectric element 11c in the z direction.

The sample 300 is placed on the stage 10 and is disposed to face the probe 99.

The cantilever 1 comes into contact with a side surface of the cantilever tip portion 8 and is configured to have a structure of a cantilevered spring. The cantilever tip portion 8 is pressed on an inclined surface block 2 by a cantilever tip portion presser 9 and the inclined surface block 2 is fixed to the vibration applying unit 3. The vibration applying unit 3 performs vibration by an electrical signal from the vibration applying power source 21 and vibrates the cantilever 1 and the probe 99 at the tip end of the cantilever 1. As a vibration applying method of the cantilever, a piezoelectric element, an electric field or a magnetic field, light irradiation, flow of a current, and the like are included.

A laser beam is applied onto a back surface of the cantilever 1 from a laser beam source 30 and the laser beam which is reflected by the cantilever 1 is incident on a dichroic mirror 31. The laser beam is reflected by a mirror 32 and detected by a displacement detection device 5. An amount of moving the cantilever 1 up and down (z direction) is included in variation (incident position) in an optical path of a laser which is incident on the dichroic mirror 31. Accordingly, the displacement detection device 5 detects an amount of displacement of the cantilever 1 based on the incident position. That is, vibration amplitude of the cantilever 1 corresponds to amplitude of an electric signal of the displacement detection device 5.

The amplitude of the electric signal of the displacement detection device 5 passes through a preamplifier 50 to be amplified and is converted into a DC level signal corresponding to height of the amplitude by an AC-DC converter 6.

The DC level signal of the AC-DC converter 6 is input to the Z control circuit 20. The Z control circuit 20 transfers a control signal to a Z signal unit of the X, Y, Z output amplifier 22 and the Z signal unit outputs a control signal (voltage) for driving the piezoelectric element 11c in the z direction such that the DC level signal coincides with a target amplitude of the probe 99 in a DFM measurement mode. That is, the above-described mechanism detects the displacement of the cantilever 1 generated by interatomic force which is interacted between the sample 300 and the probe 99, the actuator 11c is caused to have displacement such that the vibration amplitude of the probe 99 (cantilever 1) becomes the target amplitude, and force of bringing the probe 99 into contact with the sample 300 is controlled. In this state, the X, Y, Z output amplifier 22 causes the actuators 11a and 11b to respectively have displacement to perform scanning of the sample 300, and a shape and a property value of a surface are mapped with each other.

In addition, the DC level signal of the AC-DC converter 6 is input to the frequency-vibration characteristic detector 7 of the probe microscope controller 24. The electric signal from the vibration applying power source 21 is input to the frequency-vibration characteristic detector 7. The frequency-vibration characteristic detector 7 transfers a predetermined frequency-vibration characteristic signal which is computed based on inputs from the AC-DC converter 6 and the vibration applying power source 21 to the computer 40.

Regarding displacement of the stage 10 in the xy plane, (i) a three-dimensional shape image formed from displacement of height of the stage 10, (ii) a phase image formed from phase values in a resonant state, (iii) an error signal image formed by using a difference with a target value of the vibration amplitude, and (iv) a multifunctional measurement image formed from values of physical properties between the probe and the sample are displayed on the computer 40 and are analyzed or processed, and thus an operation as a probe microscope is performed.

Next, a vibration characteristic measuring method of the cantilever according to the embodiment of the present invention will be described. The vibration characteristic of the cantilever is measured in order to set an optimal condition for measurement before the scanning probe microscope 200 measures a surface of the sample 300. When a frequency modulation control (FM control, which is mainly used in a non-contact measurement mode) is performed, an initial value of a frequency of performing self-excited oscillation is set. When an amplitude modulation control (AM control) is performed, a frequency of applying vibration and a vibration applying voltage are set. When a phase control is performed, a frequency range for allowing a phase signal to be detected is set.

A measuring method of a Q value according to the embodiment of the present invention will be described with reference to FIG. 2.

First, a resonant frequency f1 (Hz) is set and a vibration amplitude V of the cantilever 1 when vibration with the resonant frequency f1 is applied from the vibration applying power source 21 to the cantilever 1 is obtained through the displacement detection device 5. The resonant frequency f1 may be obtained in advance from a thermal vibrational spectrum which is obtained by a FFT analyzer, a signal generated by a self-excited oscillation circuit, or the like. As disclosed in JP-A-2012-202841, a frequency sweep signal for reciprocating may be generated for a short time, a frequency at the maximum of amplitude in each of an approaching motion and a retracting motion may be measured, and the median value of the frequency may be employed as a resonant frequency f1.

Figure 2:
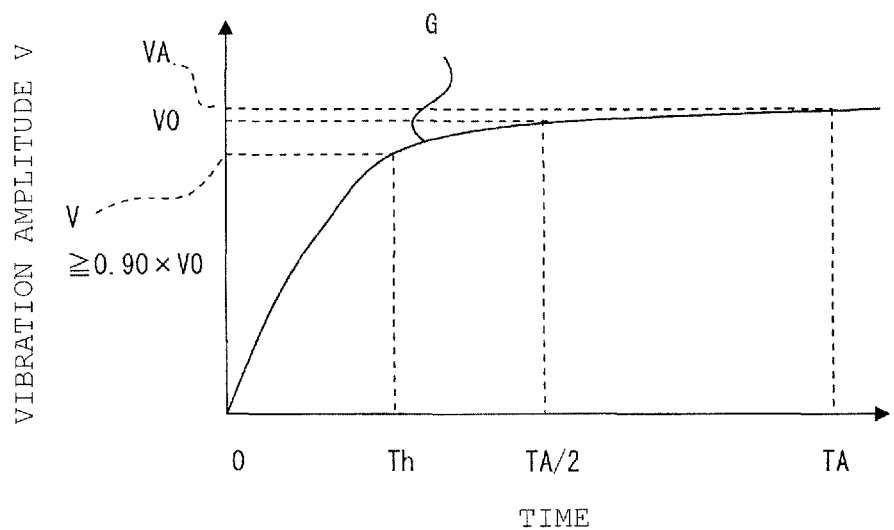
FIG. 2 is a diagram illustrating a measuring method of a Q value according to an embodiment of the present invention.

In this manner, as illustrated in FIG. 2, a time when vibration with the resonant frequency f1 is applied to the cantilever 1 is set to a time of 0 and data (graph G) of a relationship of a vibration amplitude V to a time (second) is obtained. A unit of the vibration amplitude V is arbitrarily set, but since an output of a detection element for displacement of the cantilever under control is a voltage, amplitude of the output is set to be a voltage (V) in many cases.

In the graph G, a time Th (second) when the vibration amplitude V is equal to or more than 0.9 of a stationary amplitude V0 is obtained and the Q value is calculated by the following Expression (1):

$$Q\ \text{value} = f1 \times Th \qquad (1)$$

Here, V0 corresponds to a vibration amplitude when a vibration amplitude after a time of TA (second) from applying the vibration with the resonant frequency f1 (Hz) to the cantilever is set to be VA and a vibration amplitude at a time of TA/2 (second) becomes 0.95×VA. If the amplitude at the time of TA/2 (second) becomes 0.95×VA, the vibration amplitude V may be considered to sufficiently approach a normal value.

Q value=f1/Fw (Fw: a half width (FWHM) of the Q-curve), and as Fw becomes smaller, a peak of the Q-curve becomes sharper and the Q value becomes greater. Since 1/Fw has a time dimension, the present inventor considers that a time when the vibration amplitude V of the cantilever 1 at a time of applying vibration with the resonant frequency f1 is converged corresponds to 1/Fw, and defines the Expression (1). The time Th for the amplitude V being converged and a time until the vibration amplitude V approaches V0 for obtaining a highly accurate Q value are obtained experimentally. Accordingly, Expression (1) is defined.

That is, as illustrated in Table 1, a sweep speed is sufficiently delayed to measure the Q-curve C1 (see FIG. 5) and the accurate Q value (Q0=1297) is obtained from a waveform of the Q-curve C1. Then, the graph G is obtained by using the above-described method and the Q value is calculated for each vibration amplitude V from Expression 1. As a difference between the Q value at each vibration amplitude V and the accurate Q value (Q0), {(Q0−Q)/Q0}×100% is obtained. When the Q value is calculated from Expression 1 by using a time when V=V0×0.95, the Q value becomes substantially equal to the accurate Q value (Q0). In addition, when the Q value is calculated from Expression 1 by using a time when V=V0×0.90, a difference between the Q value and the accurate Q value (Q0) becomes about 20%.

On the other hand, when the Q value is calculated from Expression 1 by using a time when V is less than V0×0.90, the difference between the Q value and the accurate Q value (Q0) largely exceeds 20%.

In measurement of the Q value, the Q value fluctuates (a range of tens of thousands to 10 or less) greatly depending on measurement circumstances (vacuum, atmosphere, solution, and the like). Thus, it has been known empirically that if the difference is substantially 20%, a practical use is possible. Accordingly, if a time in Table 1 is a time when V=V0×0.90 or a time when V=V0×0.95, that time may be employed practically as Th.

Accordingly, a time when V is equal to or more than V0×0.90 is employed as Th. If a coefficient which is multiplied by V0 when Th is obtained is equal to or more than 0.90, appropriate setting may be performed. However, in view from a short measurement time, it is preferable that a value of 0.90 to 0.95 is employed as the coefficient.

In the manner as described above, it is possible to measure the Q value which corresponds to the vibration characteristic of the cantilever with high accuracy regardless of the measurement condition of the Q-curve.

Then, a method of measuring an accurate Q-curve with high efficiency will be described using the Q value obtained by using the Expression (1).

First, Q value=f1/Fw as described above and thus Fw=f1/Q value. A frequency (absolute value of a difference between sweep a starting frequency and a sweep ending frequency) in a range to be swept at a time of measuring the Q-curve is set to be Fsw and a sweep time necessary for measuring the Q-curve in a frequency bandwidth of Fsw is set to be Tsw. A time necessary for measuring the Q-curve in a frequency bandwidth of Fw is set to be Tw.

The time Tw is proportional to an inverse number of Fw which is a frequency and thus satisfies the following Expression (a).

$$Tw = A \times (1/Fw) = A \times (Q/f1) \tag{a}$$

Where, A is a constant or may be obtained by obtaining multiple pieces of data at the sweep time Tsw when an appropriate Q value is obtained from the past data and the like and applying the obtained data to the following Expression (2). As a value of A, a value of 5 to 100 may be employed, but preferably a value of 10 to 50 and more preferably a value of 25 to 35 may be set.

The frequency and the time have a relationship of an inverse number, and thus Tsw is (Fsw/Fw) times Tw and the following expressions are made from the above-described Expression (a).

$$\begin{aligned} Tsw &= (Fsw/Fw) \times Tw \tag{2} \\ &= (Fsw/Fw) \times A \times (Q/f1) \\ &= (Fsw/(f1/Q)) \times A \times (Q/f1) \\ &= A \times Fsw \times (Q/f1)2 \end{aligned}$$

With Expression (2), it is possible to calculate the sweep time Tsw which is an optimal measurement time for any Fsw set by a user and it is possible to implement measurement of the Q-curve for allowing the Q value to be obtained with high accuracy.

Fsw has the resonant frequency f1 as the center and generally has a value of about 4 to 10 times Fw (half width of the Q-curve). If A is less than a reasonable range, a shape of the Q-curve is distorted and a measurement error of the Q value becomes large. If A is more than the reasonable range, measurement accuracy of the Q value becomes substantially the same as the reasonable range, but measurement time may become long and measurement efficiency may be degraded.

The sweep time Tsw corresponds to a measurement time when the vibration frequency is changed in a preset frequency range and the Q-curve representing the vibration amplitude of the cantilever at a time of applying vibration with the vibration frequency at that time to the cantilever is measured.

Then, the Q-curve representing the vibration amplitude to the vibration frequency is measured by using the Q value and the sweep time Tsw. With this, a correct Q-curve is obtained based on the optimal sweep speed and the waveform of this Q-curve is analyzed, and thus it is possible to obtain the further accurate Q value or the resonant frequency f1.

Figure 5:
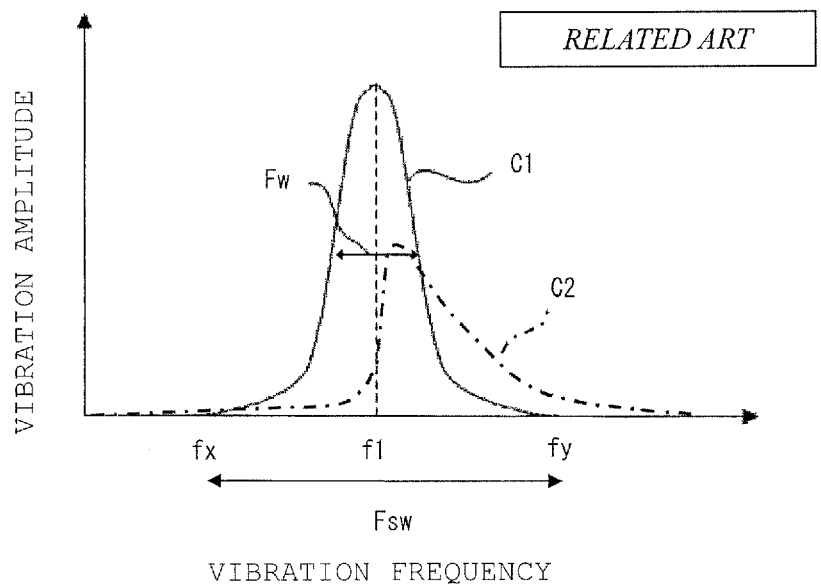
FIG. 5 is a diagram illustrating a measuring method of a resonant frequency and a Q value in the related art.

For example, in FIG. 5, Fsw corresponds to a frequency bandwidth from a frequency fx to a frequency fy. The sweep time Tsw corresponds to a measurement time necessary when a frequency is changed from the frequency fx to the frequency fy with a rate of change. Thus, the Q-curve as illustrated in FIG. 5 is obtained by measuring the vibration amplitude V of the cantilever 1 when the frequency is changed in the frequency range Fsw.

In this manner, the Q-curve is measured by using an appropriate sweep time and thus the unnecessarily long sweep time is avoided, incorrect measurement due to the excessively short sweep time does not occur, and it is possible to measure an accurate Q-curve with high efficiency.

Figure 3:
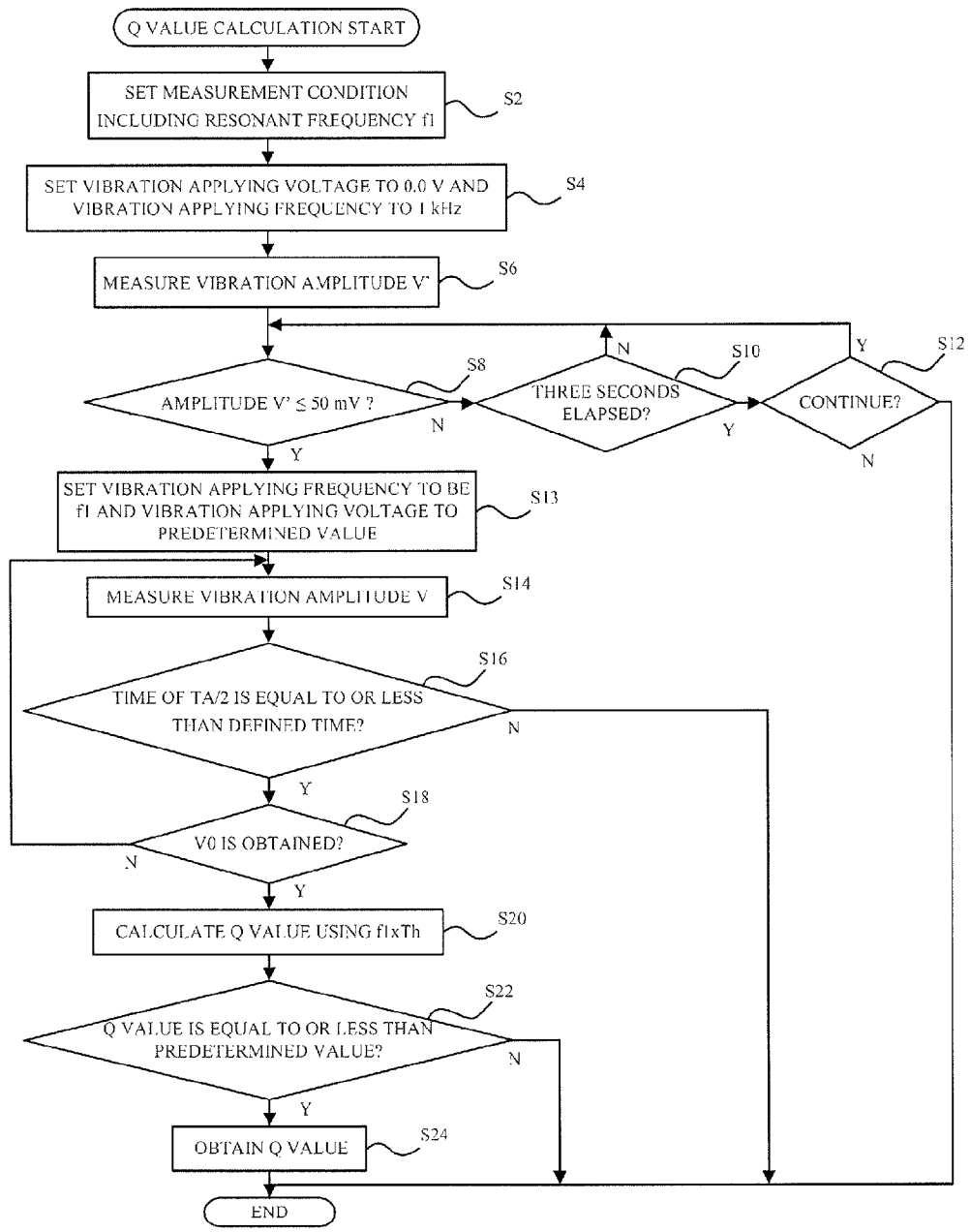
FIG. 3 is a diagram illustrating a flow of a subroutine for calculating the Q value.
Figure 4:
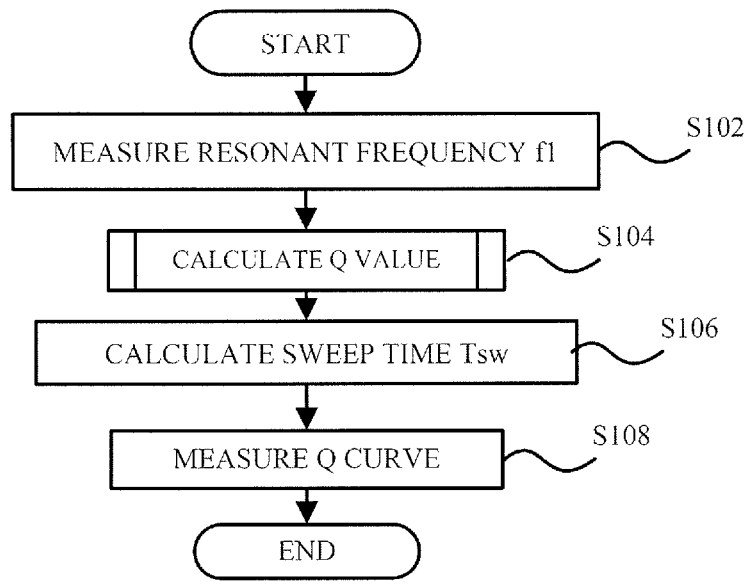
FIG. 4 is a diagram illustrating a flow of a main routine for calculating the Q value.

A measurement process flow of the vibration characteristic of the cantilever by the control unit (probe microscope controller 24 and computer 40) will be described with reference to FIGS. 3 and 4. The control unit practically corresponds to CPUs included in the probe microscope controller 24 and the computer 40. FIG. 3 illustrates a subroutine of calculating the Q value and FIG. 4 illustrates a main routine of calculating the Q value.

A vibration characteristic measuring program of the cantilever according to the present invention is stored in the storage means such as a hard disk of the computer 40. The CPU executes this program to perform processes of FIGS. 3 and 4.

In FIG. 3, first, the control unit sets a measurement condition including the resonant frequency f1 (Step S2). As described above, the resonant frequency f1 may be obtained by using a thermal vibrational spectrum which is obtained by the FFT analyzer, a signal generated by the self-excited oscillation circuit. Values may be registered in the storage means of the computer 40 in a map manner beforehand and the resonant frequency f1 may be automatically obtained from the values in accordance with the type and the like of the cantilever 1 or the resonant frequency f1 may be set by an operator inputting a value and the like of the resonant frequency f1.

Then, processes of Steps S4 to S12 are performed, but the processes of Steps S4 to S12 correspond to a process of confirming that a vibration amplitude V' at a time of setting a vibration applying voltage to 0.0 V is equal to or less than a predetermined value, before a process of calculating the Q value is performed. That is, when the vibration amplitude V' which exceeds the predetermined value is measured in Steps S4 to S12, since vibration of the cantilever is not stable in a steady state, the process of calculating the Q value is not performed and waiting is performed until the vibration of the cantilever is in the steady state. The amplitude V' in Steps S4 to S12 is different from the vibration amplitude V measured when the Q value is calculated.

Specifically, the control unit in Step S4 sets the vibration applying voltage to 0.0 V, sets a vibration applying frequency to 1 kHz, and sets the cantilever 1 to be in a steady state where vibration is not performed. The control unit measures the vibration amplitude V of the cantilever 1 through the displacement detection device 5 (Step S6) and determines whether or not the measured vibration amplitude V is equal to or less than a threshold value (50 mV) (Step S8). If it is determined to be "Yes" in Step S8, the vibration of the cantilever is determined to be stable in the steady state and to be in a normal state and the process proceeds to Step S13. If it is determined to be "No" in Step S8, the process proceeds to Step S10 and it is determined whether or not the vibration of the cantilever is equal to or less than the threshold value (50 mV) for a predetermined time (three seconds). If it is determined to be "No" in Step S10, the process returns to Step S8 and if it is determined to be "Yes" in Step S10, the process proceeds to Step S12. In Step S12, the control unit displays a screen for requiring whether or not the subroutine in FIG. 3 continues and a determination result is input through the operation unit by an operator. Thus, if the determination result indicates "Yes" in Step S12, the process returns to Step S8, and if the determination result indicates "No" in Step S12, the process is ended.

Then, in Step S13, the control unit sets the vibration applying frequency to f1 which is set in Step S2 and sets the vibration applying voltage to a predetermined value, and vibrates the cantilever 1. The control unit measures the vibration amplitude V of the cantilever 1 through the displacement detection device 5 (Step S14). A measurement result in Step S14 is obtained as the data of the relationship of the vibration amplitude V to a time from when vibration with the resonant frequency f1 as illustrated in FIG. 2 is applied.

Then, the control unit determines whether or not the stationary amplitude V0 and the time of TA/2 (second) are obtained. Specifically, in Step S16, the control unit determines whether or not the time of TA/2 (second) is equal to or less than a defined time when a vibration amplitude at the time of TA/2 (second) is set to be VA, from the multiple pieces of data obtained in Step S14. If it is determined to be "Yes" in Step S16, the process proceeds to Step S18. If it is determined to be "No" in Step S16, a time until the vibration amplitude is in the steady state is excessively long, there is a probability of an operation of a system being abnormally performed, and thus measurement is ended. This is because, in this case, the Q value may be a high value to the extent of exceeding assumption or may or may be not in a normal resonant state.

Then, in Step S18, the control unit determines whether or not V0 is obtained. If it is determined to be "No" in Step S18, since V0 is not obtained (not converged), the process returns to Step S14 and if it is determined to be "Yes" in Step S18, the process proceeds to Step S20.

In Step S20, the control unit obtains a time Th (second) when the vibration amplitude V becomes 0.95 of the stationary amplitude V0, from the multiple pieces of data obtained in Step S14 and calculates the Q value by using the Expression (1): Q value=f1×Th. Here, f1 is a value set in Step S2.

Then, in Step S22, the control unit determines whether or not the Q value which is calculated in Step S20 is equal to or less than a predetermined value (for example, 50,000). If it is determined to be "No" in Step S22, the Q value is an abnormal value and there is a probability of the system being not normal, and thus measurement is ended. If it is determined to be "Yes" in Step S22, the process proceeds to Step S24.

In Step S24, the control unit obtains the Q value calculated in Step S20, stores the Q value in the storage means of the appropriate computer 40, and ends the process.

Then, the main routine for measuring the Q-curve will be described with reference to FIG. 4.

In FIG. 4, first, the control unit measures the resonant frequency f1 (Step S102). Specifically, f1 is measured by using the simple method disclosed in JP-A-2012-202841. The resonant frequency f1 may be measured by a thermal vibrational spectrum which is obtained by a FFT analyzer, a signal generated by a self-excited oscillator circuit, or the like and an input value may be set as the resonant frequency f1 without performing a process of Step S102.

Then, in Step S104, the control unit sets the Q value obtained in the subroutine. In Step S106, the control unit calculates the sweep time Tsw based on f1 and Q value obtained in Steps S102 and S104 by using Expression 2: sweep time Tsw (second)=A×Fsw×(Q/f1)2. As the constant A, a value of 5 to 100 may be employed, but preferably a value of 10 to 50, and more preferably a value of 25 to 35 may be employed.

Then, in Step S108, the control unit automatically measures the Q-curve based on the sweep time Tsw which is calculated in Step S106. Specifically, the vibration frequency is changed (swept) in the preset frequency range, the frequency is changed such that a measurement time at a time of measuring the Q-curve representing the vibration amplitude of the cantilever when vibration with the vibration frequency is applied to the cantilever becomes Tsw, and then the vibration amplitude V of the cantilever 1 at this time is measured. Accordingly, the Q-curve as illustrated in FIG. 5 is obtained.

The vibration characteristic measuring program according to the present invention is made in such a manner that a process flow which is illustrated in FIGS. 3 and 4 is stored in memory or storage provided in the control unit (computer 40) or in a storage medium that is readable by the control unit as a computer program. The vibration characteristic measuring program is executed by the CPUs which are included in the probe microscope controller 24 and the computer 40.

The present invention is not limited to the above-described embodiment.

As an example related to the embodiment, the cantilever 1 which has a nominal value of the resonant frequency being 25.501 kHz is attached to the scanning probe microscope 200 illustrated in FIG. 1, the sweep speed is sufficiently delayed to measure the Q-curve C1 (see FIG. 5), and the accurate Q value is obtained from the waveform of the measured Q-curve C1, Q0=1297. In the above-described method, the graph G illustrated in FIG. 2 is obtained and the Q value is calculated for each vibration amplitude V by using the Expression (1). Thus, as a difference between the Q value at each vibration amplitude V and the accurate Q value (Q0), {(Q0−Q)/Q0}×100% is obtained.

The result obtained by this example is shown in Table 1 below.

TABLE 1

| vibration mplitude | time | Q value | difference (%) |
|---|---|---|---|
| V0 × 0.95 | 0.050 | 1275 | 1.7 |
| V0 × 0.90 | 0.040 | 1020 | 21.4 |
| V0 × 0.85 | 0.037 | 944 | 27.2 |
| V0 × 0.80 | 0.034 | 867 | 33.2 |
| V0 × 0.75 | 0.022 | 561 | 56.7 |
| V0 × 0.70 | 0.018 | 459 | 64.6 |

In Table 1, when the Q value is calculated from the Expression (1) by using a time when V=V0×0.95, a difference between the Q value and the accurate Q value (Q0) is less than 2%, and the Q value and the accurate Q value (Q0) are substantially equal to each other. When the Q value is calculated from the Expression (1) by using a time when V=V0×0.90, the difference between the Q value and the accurate Q value (Q0) is about 20%. On the other hand, when the Q value is calculated from the Expression (1) by using a time of V being less than V0×0.90 (V0×0.85 to V0×0.70), the difference between the Q value and the accurate Q value (Q0) largely exceeds 20%.

With this, it is understood that a time when V being equal to or more than V0×0.90 may be employed as the time Th.

As described in above with respect to the embodiment, according to an aspect of the present invention, there is provided a vibration characteristic measuring method of a cantilever including: measuring vibration amplitude V of a cantilever of a scanning probe microscope when vibration with a resonant frequency f1 (Hz) is applied to the cantilever, obtaining a time Th (second) when the vibration amplitude V is equal to or more than 0.90 of a stationary amplitude V0, and calculating a Q value by using the Expression (1): Q value=f1×Th.

According to this vibration characteristic measuring method of the cantilever, it is possible to measure a Q value which corresponds to a vibration characteristic of the cantilever in a scanning probe microscope with high accuracy based on a pre-obtained resonant frequency f1 regardless of a measurement condition of a Q-curve.

The stationary amplitude V0 may correspond to a vibration amplitude when a vibration amplitude after a time of TA (second) from applying the vibration with the resonant frequency f1 (Hz) to the cantilever is set to be VA and a vibration amplitude at a time of TA/2 (second) becomes 0.95×VA.

According to this vibration characteristic measuring method of the cantilever, the stationary amplitude V0 which is necessary for measuring the Q value is obtained with high accuracy for a relative short time.

When a Q-curve representing a vibration amplitude of the cantilever is measured by sweeping a frequency to be applied to the cantilever, if an absolute value of a difference between a sweep starting frequency and a sweep ending frequency is set to be Fsw (Hz) and a measurement time at this time in the Q-curve is set to be a sweep time Tsw (second), the Q-curve may be measured by using the sweep time Tsw (second) which is calculated by the Expression (2): Tsw (second)=A×Fsw×(Q/f1) (where, A is a positive constant).

According to this vibration characteristic measuring method of the cantilever, an optimal sweep time for measuring the Q-curve is obtained by using the Q value which is obtained by using the Expression (1) and thus it is possible to measure an accurate Q-curve with high efficiency.

According to the present invention, it is possible to measure a Q value which corresponds to a vibration characteristic of a cantilever in a scanning probe microscope for a short time regardless of a measurement condition of a Q-curve. It is possible to implement measurement of a Q-curve for obtaining a highly accurate Q value by measuring an optimal sweep time for measuring the Q-curve based on the Q value measured in an embodiment according to the present invention.

What is claimed is:

1. A method for measuring vibration characteristic of a cantilever, the method comprising:
   measuring vibration amplitude V of a cantilever installed in a scanning probe microscope when vibration with a resonant frequency f1 (Hz) is applied to the cantilever;
   obtaining a time Th (second) when the vibration amplitude V is equal to or more than 0.90 of a stationary amplitude V0; and
   calculating a Q value by using the following Expression (1):
   $$Q \text{ value} = f1 \times Th. \quad (1)$$

2. The method according to claim 1,
   wherein the stationary amplitude V0 corresponds to a vibration amplitude when a vibration amplitude after a time of TA (second) from applying the vibration with the resonant frequency f1 (Hz) to the cantilever is set to be VA and a vibration amplitude at a time of TA/2 (second) becomes 0.95×VA.

3. The method according to claim 1,
   wherein when a Q-curve representing a vibration amplitude of the cantilever is measured by sweeping a frequency to be applied to the cantilever, if an absolute value of a difference between a sweep starting frequency and a sweep ending frequency is set to be Fsw (Hz) and a measurement time at this time in the Q-curve is set to be a sweep time Tsw (second), the Q-curve is measured by using the sweep time Tsw (second) which is calculated by the following Expression (2):
   $$Tsw = A \times Fsw \times (Q/f1)^2 \quad (2)$$
   wherein, A is a positive constant.

4. A non-transitory computer-readable storage medium storing instructions to control a scanning probe microscope comprising a cantilever having a probe at a tip end, a cantilever vibrating unit that applies vibration to the cantilever, a displacement detection device that detects an amount of displacement of the cantilever and measures a vibration amplitude V of the cantilever and a control unit that controls the cantilever vibrating unit, the instructions causing the scanning probe microscope to perform:
   measurement processing for measuring vibration amplitude V of the cantilever by the displacement detection device when a vibration with a resonant frequency f1 (Hz) is applied to the cantilever by the cantilever vibrating unit;
   obtaining processing for obtaining a time Th (second) when the vibration amplitude V is equal to or more than 0.90 of a stationary amplitude V0 by the control unit; and
   calculation processing for calculating a Q value by the control unit by using the following Expression (1):
   $$Q \text{ value} = f1 \times Th. \quad (1)$$

5. A scanning probe microscope comprising:
   a cantilever having a probe at a tip end;
   a cantilever vibrating unit configured to apply vibration to the cantilever;
   a displacement detection device configured to detect an amount of displacement of the cantilever and to measure a vibration amplitude V of the cantilever; and
   a control unit configured to control the cantilever vibrating unit,
   wherein the displacement detection device measures the vibration amplitude V of the cantilever when a vibration with a resonant frequency f1 (Hz) is applied to the cantilever by the cantilever vibrating unit,
   wherein the control unit obtains a time Th (second) when the vibration amplitude V is equal to or more than 0.90 of a stationary amplitude V0, and
   wherein the control unit calculates a Q value by the control unit by using the following Expression (1):
   $$Q \text{ value} = f1 \times Th. \quad (1)$$

* * * * *